United States Patent [19]

Powers et al.

[11] 3,923,768

[45] Dec. 2, 1975

[54] TREATMENT OF TALL OIL FATTY ACIDS

[75] Inventors: John R. Powers; Frances M. Miller, both of Charleston, S.C.

[73] Assignee: Westvaco Corporation, New York, N.Y.

[22] Filed: Nov. 18, 1974

[21] Appl. No.: 524,664

[52] U.S. Cl. .............................. 260/97.5; 260/97.6
[51] Int. Cl.² ........................................... C09F 1/00
[58] Field of Search .......................... 260/97.5, 97.6

[56] References Cited
UNITED STATES PATENTS

| | | | |
|---|---|---|---|
| 3,157,629 | 11/1964 | Patrick | 260/97.5 |
| 3,377,334 | 4/1968 | McBride | 260/97.5 |
| 3,528,959 | 9/1970 | Patrick | 260/97.5 |
| 3,649,612 | 3/1972 | Scharrer | 260/97.5 |

*Primary Examiner*—Melvyn I. Marquis
*Assistant Examiner*—William E. Parker
*Attorney, Agent, or Firm*—Richard L. Schmalz; Ernest B. Lipscomb, III

[57] ABSTRACT

A process is disclosed for disproportionating distilled tall oil fatty acids, whereby the non-conjugated linoleic acid present is substantially, completely isomerized to conjugated linoleic acid and disproportionated to oleic acid under such conditions as to avoid isomerization of the oleic acid present to eladic acid.

2 Claims, No Drawings

3,923,768

TREATMENT OF TALL OIL FATTY ACIDS

BACKGROUND OF THE INVENTION

1. Field of the Invention

This invention relates to the conversion of the linoleic acid portion contained in distilled tall oil fatty acids to oleic acid. More particularly, this invention relates to a process for both isomerizing and disproportionating distilled tall oil fatty acids with iodine to increase the yield of oleic acid.

Tall oil fatty acids normally consist of a major portion of $C_{18}$-monounsaturated acids and $C_{18}$-diunsaturated acids (in approximately equal proportions), small quantities of triunsaturated acids, saturated acids and unsaponifiables. Also, since tall oil fatty acids are derived from tall oil, which contains substantial quantities of rosin acids, small quantities of the latter may also be present. The Bureau of the Census of the U.S. Department of Commerce has accepted the definition of "tall oil fatty acids" as that material produced from crude tall oil which contains 90 percent or more free fatty acids excluding rosin acids. Most commercially available tall oil fatty acids contain substantially more than 90 percent fatty acids and substantially less than 10 percent rosin acids. The following is an analysis of a typical distilled tall oil fatty acid.

|  | Percent |
|---|---|
| Saturated Acids | 3 |
| Oleic Acids | 47 |
| Linoleic Acids | 40 |
| Linolenic Acids | 5 |
| Unsaponifiables | 1 |
| Rosin Acids | 4 |
|  | 100 |

2. The Prior Art

This invention, as will be outlined hereinbelow, is to be distinguished from the processes for treating tall oil fatty acids exemplified in the following prior art patents.

U.S. Pat. No. 3,157,629 to Patrick teaches a process for treating tall oil fatty acids through partial hydrogenation and dimerization of tall oil fatty acids by heating the tall oil fatty acids in the presence of an iodine catalyst to a temperature within the range of 450°F.–550°F. The subject invention distinguishes over the Patrick patent in that little or no dimerization occurs during the reaction, which is performed at lower temperatures.

U.S. Pat. No. 2,411,111 to Ralston et al. is directed to a process for the treatment of unconjugated polyene material, such as linoleic acid, by heating in the presence of below 0.2 percent of an amine hydroiodide at a temperature above 392°F. for a time until the polyene material is conjugated but before the material is heat bodied, i.e., disproportionated.

U.S. Pat. No. 2,311,386 to Hasselstrom teaches a process in which tall oil containing a relatively large portion, e.g., above 10 percent, of rosin acids is heated at from 302°F. to 392°F. in the presence of an iodine catalyst, whereupon hydrogen is generated largely from the abietic acids and the hydrogen thus generated serves to hydrogenate the other rosin acids present, as well as, the unsaturated fatty acids. Thus, the reaction of Hasselstrom yields a product in which the polyunsaturated fatty acids originally present are hydrogenated. U.S. Pat. No. 2,617,792 to Floyd is cited as being similar to Hasselstrom.

Lastly, U.S. Pat. No. 2,794,017 to Palmer teaches treating a tall oil material containing at least 5 percent and not more than 75 percent rosin with a sulfur dioxide or iodine catalyst at a temperature above 428°F. The disclosure of the Palmer patent and the product obtained is quite similar to that disclosed in the Hasselstrom patent due to the large amounts of rosin acids present.

It is thus a general object of this invention to provide a process for producing a tall oil fatty acid material which has an increased yield of oleic acid.

Another object of this invention is to provide a process for treating distilled tall oil fatty acids in such a manner as to selectively conjugate the non-conjugated linoleic acid portion and disproportionate the same while avoiding substantial isomerization of the oleic acid present to eladic acid.

Still another object of this invention is to provide a process for disproportionating distilled tall oil fatty acids containing less than 5 percent rosin acids in the starting material with iodine under selective conditions to produce a low titer, dimer free material.

Other objects, features and advantages of the invention will become apparent from the foregoing detailed description.

SUMMARY OF THE INVENTION

It has been surprisingly discovered that it is possible to isomerize and disproportionate in a single step tall oil fatty acids at selective conditions to increase the yield of oleic acid. This is accomplished by heating a distilled tall oil fatty acid, that is, a tall oil fatty acid fraction containing only small amounts, i.e., less than 5 percent, of rosin acids in the presence of 0.2 to 1.0 percent of an iodine catalyst at a temperature between 250°F. and 430°F. for from about 0.5 hour to 2.5 hours. The use of the selective conditions set forth hereinabove eliminates the production of substantial amounts of dimerized fatty acid material, as well as, problems occurring with disproportionation of large amounts of rosin acids, which is accompanied by the generation of substantial amounts of hydrogen resulting in hydrogenation of the unsaturated fatty acids. Thus, two of the main undesirable results, dimerization and hydrogenation, of the prior art processes are overcome through the use of the selective conditions set forth in the process of this invention.

DETAILED DESCRIPTION OF THE INVENTION

Fatty acid disproportionation in the presence of iodine proceeds via a two-step process shown by isomerization reaction [1] and disproportionation reaction [2] below.

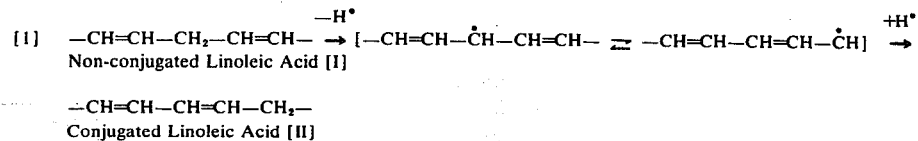

[1] —CH=CH—CH₂—CH=CH— $\xrightarrow{-H^\bullet}$ [—CH=CH—ĊH—CH=CH— $\rightleftarrows$ —CH=CH—CH=CH—ĊH] $\xrightarrow{+H^\bullet}$ Non-conjugated Linoleic Acid [I]

—CH=CH—CH=CH—CH₂—

Conjugated Linoleic Acid [II]

[2] 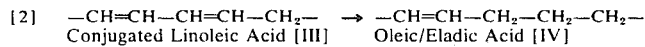
Conjugated Linoleic Acid [III]   Oleic/Eladic Acid [IV]

These reactions imply that iodine attack at the methylene (—CH$_2$—) fragment between the two double bonds (I → II) and iodine attack on a conjugated double bond (III → IV) are both energetically more favorable than iodine attack on an isolated (non-conjugated) double bond (I → IV).

It was thus found that using selective conditions of temperature and catalyst the isomerization of the oleic acid present in the tall oil fatty acids to eladic acid is avoided. Since the freezing point of oleic acid is lower than that of eladic acid, the product produced was found to have a significantly lower titer than the current products produced according to the process of the Patrick U.S. Pat. No. 3,157,629. The process uses selective disproportionation of linoleic acid while avoiding the cis → trans isomerization of oleic acid at a temperature lower than those used for the Patrick disproportionation. The lower temperature and higher catalyst level were found to result in significant reduction in dimer acid formation, thus yielding a corresponding increase in yield of distilled product. The data show that although an increase in catalyst concentration was required that a lower titer product is prepared along with the improved yields by the appropriate modifications of the reaction conditions.

The starting material is a tall oil fatty acid that has been distilled to contain less than 5 percent by weight rosin acids. At rosin contents above about 5 percent undesirable side reactions, such as hydrogenation take place preventing the higher yields of the more desirable oleic acid. Through modern distillation technology, fatty acids are commercially available containing only about 1 percent rosin acids. The lower the rosin acid content of the starting fatty acid the more desirable, because the higher the rosin content the greater will be the catalyst requirement to achieve the same result.

The amount of iodine catalyst employed in the process of this invention is from at least above 0.2 to 1.0 percent of the tall oil fatty acids, preferably between about 0.2 and 0.4 percent. The amount of iodine catalyst used must be within this critical range, as well as, the temperatures used in order to achieve the results obtained. Sufficient iodine catalyst must be used, however, to obtain a satisfactory conversion rate of the non-conjugated to conjugated linoleic acid. However, when high concentration of iodine, above about 1% is used, the results are detrimental being in the formation of substantial qualities of undesirable saturated acids and dark product.

The temperature varies inversely with the amount of catalyst used being between 250°F. and 430°F. For example, at the upper catalyst level of 1.0 percent, a temperature of only 250°F. is needed to perform the reaction. With the temperature increasing to 430°F., smaller amounts of catalyst, down to 0.2 percent, are used. The preferred temperature range for use with the most desirable catalyst level is between 380°F. and 420°F. The time for performing these reactions may be as short as 30 minutes and lasting up to 2.5 hours, depending upon the catalyst level and temperature.

Distillation in a vacuum of the products produced by the prior art processes of heating the tall oil fatty acids with iodine has been used to separate the fatty acids from the dimerized acids. An advantage of the process of this invention is because of the increased yield of oleic acid; because due to lack of dimer formation, this step is unnecessary. If it is desired to improve the physical appearance of the products treated according to the process of this invention, i.e., color, by distillation, there is a remarkable increase in distilled yield when the fatty acids are distilled by this method as there are little or no non-volatiles (non-distillable dimers), dimeric and polymeric products produced as reaction by-products.

The tall oil fatty acid products produced according to the process of this invention show improvement over the prior art products in improved yield, lower titer, improved acid number and no formation of dimer acids. The products thus produced according to this invention find special application as substitutes for oleic acids and are a logical choice in synthetic rubber latex manufacture, baking-type alkaline resins, various kinds of soap and cleaner formulations, wax polishes and synthetic resin emulsions and as intermediates for the manufacture of textile chemicals.

The properties of the fatty acid products produced according to the process of this invention were determined by analytical GLC on a 7.5 foot ⅛ inch ID, 15% DEGS on Varaport 30 (80–100 mesh) column. Dimer content of the products was determined by analytical GLC on a 3 foot, ⅛ inch ID, 3% OV-1 on Chromosorb G (80–100 mesh) column.

The practice of this invention may clearly be seen in the following examples.

EXAMPLE 1

This example is to illustrate the practice of this invention under the prior art Patrick U.S. Pat. No. 3,157,629. Distilled tall oil fatty acid was heated to 485°F. at 12 p.s.i. in the presence of 0.06 percent iodine catalyst. After maintaining the temperature at 500°F. for 1 – 2 hours, the composition of the mixture which had an iodine value of 93, an acid number of 190 and a titer of 20°C. was in part as follows:

|  | Percent |
| --- | --- |
| Linoleic Acids (non-conjugated) | 3 |
| Linoleic Acids (conjugated) | 17 |
| Oleic Acids | 63 |
| Saturated Fatty Acids | 3 |
| Unsaponifiables | 3 |
| Dimer Acids | 11 |
| Rosin Acids | <0.5 |
|  | 100 |

Distillation of the total treated fatty acids yielded a distillate of 65 percent.

EXAMPLE 2

The starting material for Examples 2 through 10 was a distilled tall oil fatty acid having the following composition:

|  | Percent |
| --- | --- |
| Linoleic Acids (non-conjugated) | 8.7 |
| Linoleic Acids (conjugated) | 29.9 |

-continued

| | Percent |
|---|---|
| Oleic Acids | 51.3 |
| Saturated Fatty Acids | ca. 8.5 |
| Unsaponifiables | 1.0 |
| Rosin Acids | <0.5 |
| | 99.9 |

The refractive index at 50°C. of this material was 1.4609, the acid number 198 and the saponification number 207.

A sample of the fatty acid was reacted with 1.0% iodine at 300°F. for 2 hours. An analysis of the material showed that the acid number was 200.1, the saponification number was 202.2 and the material had a titer of 15.2°C.

EXAMPLE 3

The starting material for this example was the same as for Example 2. The reaction was carried out using 0.40% iodine at 380°F. for 40 minutes. The material was then steam sparged for 1 hour. After the reaction was completed, the fatty acids had an iodine value of 93, an acid number of 194, a saponification number of 196 and a titer of 12.7°C. The product had the following fatty acid composition:

| | Percent |
|---|---|
| Linoleic Acids (non-conjugated) | <2.0 |
| Linoleic Acids (conjugated) | 26.4 |
| Oleic Acids | 62.7 |
| Saturated Fatty Acids | ca. 9.0 |
| Dimer Acids | <1.0 |
| | 101.1 |

The lower titer indicates minimal isomerization of oleic acid to eladic acid. Distillation to improve color of the total treated fatty acids yielded a distillate fraction of 91 percent.

EXAMPLE 4

The starting material for this example was the same as for Example 2 except the reaction was carried out using 0.35 percent iodine at 380°F. for 1 hour. The material was then steam sparged for 40 minutes. After the reaction was completed, the fatty acids had an iodine value of 93, an acid number of 194, a saponification number of 197 and a titer of 12.5°C. The product had the following fatty acid composition:

| | Percent |
|---|---|
| Linoleic Acids (non-conjugated) | < 2.0 |
| Linoleic Acids (conjugated) | 24.3 |
| Oleic Acids | 62.3 |
| Saturated Fatty Acids | ca. 10.0 |
| Dimer Acids | < 1.0 |
| | 99.6 |

The low yield of dimer acids (<1.0%) and higher yield of oleic acid (62.3 percent vs. 51.3 percent in starting material) indicates the degree of isomerization and disproportionation obtained. The lower titer (20°C. to 12.5°C.) indicates minimal isomerization of oleic acid to eladic acid.

EXAMPLE 5

The starting material for this example was the same as for Example 2 except the reaction was carried out using 0.30 percent iodine at 390°F. for 2.5 hours. The material was then steam sparged for 1 hour. After the reaction was completed, the fatty acids had an iodine value of 93, an acid number of 192, a saponification number of 194 and a titer of 13.6°C. The product had the following fatty acid composition:

| | Percent |
|---|---|
| Linoleic Acids (non-conjugated) | <2.0 |
| Linoleic Acids (conjugated) | 21.3 |
| Oleic Acids | 67.0 |
| Saturated Fatty acids | ca. 9.0 |
| Dimer Acids | <1.0 |
| | 100.3 |

Distillation of the total treated fatty acids to improve color yielded a distillate fraction of 83 percent as compared to the distillation yield of 65 percent in Example 1.

EXAMPLE 6

The starting material for this example was the same as for Example 2 except the reaction was carried out using 0.30 percent iodine at 410°F. for 1.5 hours. The material was then steam sparged for 1 hour. After the reaction was completed, the fatty acids had an iodine value of 91, an acid number of 193, a saponification number of 198 and a titer of 14.4°C. The product had the following fatty acid composition:

| | Percent |
|---|---|
| Linoleic Acids (non-conjugated) | < 2.0 |
| Linoleic Acids (conjugated) | 20.6 |
| Oleic Acids | 67.6 |
| Saturated Fatty Acids | ca. 9.0 |
| Dimer Acids | < 1.0 |
| | 100.2 |

Distillation of the total treated fatty acids yielded a distillate fraction of 83 percent. The low dimer yield and titer are indicative of the success of the process.

EXAMPLE 7

The starting material for this example was the same as for Example 2 except the reaction was carried out using 0.25 percent iodine at 420°F. for 1.5 hours. After the reaction was completed, the fatty acids had an iodine value of 91, an acid number of 194, a saponification number of 195 and a titer of 12.9°C. The product had the following fatty acid composition:

| | Percent |
|---|---|
| Linoleic Acids (non-conjugated) | < 2.0 |
| Linoleic Acids (conjugated) | 22.0 |
| Oleic Acids | 66.0 |
| Saturated Fatty Acids | 9.0 |
| Dimer Acids | < 1.0 |
| | 100.0 |

Distillation of the total treated fatty acids to improve color yielded a distillate fraction of 81 percent. The results indicate desired disproportionation to oleic acid took place without forming dimer acids, and the low

EXAMPLE 8

The starting material for this example was the same as for Example 2 except the reaction was carried out using 0.20 percent iodine at 425°F. for 1.5 hours. After the reaction was completed, the fatty acids had an iodine value of 90, an acid number of 193, a saponification number of 200 and a titer of 13.6°C. The product had the following fatty acid composition:

|  | Percent |
| --- | --- |
| Linoleic Acids (non-conjugated) | < 2.0 |
| Linoleic Acids (conjugated) | 23.0 |
| Oleic Acids | 64.7 |
| Saturated Fatty Acids | ca. 9.0 |
| Dimer Acids | < 1.0 |
|  | 99.7 |

Distillation of the total treated fatty acids to improve color yielded a distillate fraction of 80 percent. The results indicate the reaction at these conditions was as desired.

EXAMPLE 9

The starting material for this example was the same as for Example 2 except the reaction was carried out using 0.20 percent iodine at 420°F. for 1.5 hours. The material was then steam sparged for 1.5 hours. After the reaction was completed, the fatty acids had an iodine value of 93, an acid number of 193, a saponification number of 197 and a titer of 13.5°C. The product had the following fatty acid composition:

|  | Percent |
| --- | --- |
| Linoleic Acids (non-conjugated) | < 2.0 |
| Linoleic Acids (conjugated) | 24.9 |
| Oleic Acids | 62.6 |
| Saturated Fatty Acids | ca. 9.0 |
| Dimer Acids | < 1.0 |
|  | 99.5 |

Distillation of the total treated fatty acids to improve color yielded a distillate fraction of 81 percent. The results again indicate the desired product was obtained.

EXAMPLE 10

The starting material for this example was the same as for Example 2 except the reaction was carried out using 0.20 percent iodine at 430°F. for 1.5 hours. The material was then steam sparged for 1.5 hours. After the reaction was completed, the fatty acids had an iodine value of 91, an acid number of 192, a saponification number of 196 and a titer of 15.2°C. The product had the following fatty acid composition:

|  | Percent |
| --- | --- |
| Linoleic Acids (non-conjugated) | < 2.0 |
| Linoleic Acids (conjugated) | 24.4 |
| Oleic Acids | 65.5 |
| Saturated Fatty Acids | ca. 9.0 |
| Dimer Acids | < 1.0 |
|  | 101.9 |

In summary, the results in Examples 2-10 show the desired isomerization of non-conjugated linoleic acid and disproportionation of conjugated linoleic acid was obtained as desired, as evidenced by the minute amounts of dimer acid formed and the increase in oleic acid. Additionally, the lower titer of the products is clearly indicated, as well as, an increase in acid number.

While the invention has been descirbed and illustrated herein by references to various specific materials, procedures and examples, it is understood that the invention is not restricted to the particular materials, combinations of materials, and procedures selected for that purpose. Numerous variations of such details can be employed, as will be appreciated by those skilled in the art.

What is claimed is:

1. A process for disproportionating tall oil fatty acids containing less than 5 percent rosin acids which comprises, heating said tall oil fatty acids at a temperature between 250°F. and 430°F. in the presence of from at least 0.2 to about 1.0 percent by weight of said tall oil fatty acids of iodine for from 30 minutes to 2.5 hours to convert the linoleic acid present in the fatty acids to oleic acid.

2. The process of claim 1 wherein said temperature is between 380°F. and 420°F. and said iodine catalyst is present in an amount from 0.2 to 0.4 percent by weight.

* * * * *

UNITED STATES PATENT OFFICE
CERTIFICATE OF CORRECTION

PATENT NO. : 3,923,768
DATED : December 2, 1975
INVENTOR(S) : John R. Powers and Frances C. Miller It is certified that error appears in the above—identified patent and that said Letters Patent are hereby corrected as shown below:

On the cover page, column 1, line 2, "Inventors: John R. Powers; Frances M. Miller," should read --Inventors: John R. Powers; Frances C. Miller,--.

Column 4, line 30, after "7.5 foot" insert --,--.

Column 8, line 28, "descirbed" should read --described--.

Signed and Sealed this twentieth Day of April 1976

[SEAL]

Attest:

RUTH C. MASON
*Attesting Officer*

C. MARSHALL DANN
*Commissioner of Patents and Trademarks*